(12) United States Patent
Shiroma et al.

(10) Patent No.: US 10,583,502 B2
(45) Date of Patent: Mar. 10, 2020

(54) CUTTING INSERT AND CUTTING TOOL

(71) Applicant: TUNGALOY CORPORATION, Fukushima (JP)

(72) Inventors: Hikaru Shiroma, Iwaki (JP); Yosuke Yamada, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 16/048,257

(22) Filed: Jul. 28, 2018

(65) Prior Publication Data

US 2019/0047059 A1 Feb. 14, 2019

(30) Foreign Application Priority Data

Aug. 10, 2017 (JP) ................. 2017-155483

(51) Int. Cl.
   *B23C 5/20* (2006.01)
   *B23C 5/10* (2006.01)

(52) U.S. Cl.
   CPC .............. *B23C 5/207* (2013.01); *B23C 5/109* (2013.01); *B23C 2200/0411* (2013.01); *B23C 2200/087* (2013.01); *B23C 2200/201* (2013.01); *B23C 2200/203* (2013.01); *B23C 2200/28* (2013.01); *B23C 2210/0407* (2013.01); *Y10T 407/2202* (2015.01); *Y10T 407/2274* (2015.01); *Y10T 407/23* (2015.01); *Y10T 407/235* (2015.01)

(58) Field of Classification Search
   CPC . B23C 5/109; B23C 5/207; B23C 2200/0411; B23C 2200/201; B23C 2200/203
   See application file for complete search history.

(56) References Cited

U.S. PATENT DOCUMENTS

| 7,972,091 B2 * | 7/2011 | Svenningsson | B23C 5/10 407/113 |
| 8,556,546 B2 * | 10/2013 | Smilovici | B23C 5/06 407/42 |
| 8,696,263 B2 * | 4/2014 | Saji | B23C 5/109 407/113 |

(Continued)

FOREIGN PATENT DOCUMENTS

| JP | 2003-275920 A | 9/2003 |
| JP | 2015-193049 A | 11/2015 |
| WO | 2010/114094 A1 | 10/2010 |

*Primary Examiner* — Eric A. Gates
(74) *Attorney, Agent, or Firm* — Studebaker & Brackett PC

(57) ABSTRACT

Provided is a cutting insert capable of suppressing edge fracture when a work having high hardness is machined. A cutting insert includes two end surfaces having a plurality of corner parts and opposed to each other, a peripheral side surface extending between the two end surfaces, and a cutting edge formed at an intersecting edge between at least one of the two end surfaces and the peripheral side surface. The cutting edge has at least a first corner edge, a second corner edge, a major cutting edge, and an end cutting edge. The end cutting edge has a circular-arc shape, which projects outward, as viewed from the side of the end surface. The end cutting edge has a width which is from 15% to 50% of the width of the cutting insert. The end cutting edge has an arc radius which is from ⅓ to 1/1 of the width of the cutting insert.

5 Claims, 9 Drawing Sheets

(56) References Cited

U.S. PATENT DOCUMENTS

| | | | |
|---|---|---|---|
| 8,740,518 B2* | 6/2014 | Ishi | B23C 5/109 |
| | | | 407/113 |
| 8,950,984 B2* | 2/2015 | Choi | B23C 5/202 |
| | | | 407/114 |
| 10,239,134 B2* | 3/2019 | Saji | B23C 5/109 |
| 10,335,872 B2* | 7/2019 | Oikawa | |
| 2003/0170079 A1* | 9/2003 | Daiguji | B23C 5/006 |
| | | | 407/34 |
| 2004/0223818 A1* | 11/2004 | Sheffler | B23C 5/109 |
| | | | 407/48 |
| 2007/0071560 A1* | 3/2007 | Karonen | B23B 27/16 |
| | | | 407/34 |
| 2012/0009029 A1 | 1/2012 | Saji | |
| 2018/0339350 A1* | 11/2018 | Mura | B23C 5/109 |
| 2019/0030629 A1* | 1/2019 | Vlcek | B23C 5/207 |
| 2019/0061024 A1* | 2/2019 | Shiroma | B23C 5/109 |

* cited by examiner

CUTTING INSERT AND CUTTING TOOL

BACKGROUND

Field

The present invention relates to a cutting insert and a cutting tool.

Description of Related Art

An indexable end mill has been used as a cutting tool for machining for a mold, etc. The cutting tool of this kind includes a substantially columnar tool body part and a cutting insert mounted at an axial leading end of the tool body part.

In relation to the cutting tool as described above, it has been an important object to improve the strength of the edge in order to achieve high-feed machining. The cutting insert proposed in WO 2010/114094 has a major cutting edge formed to have a greater thickness than a central flat surface thereof, so that the major cutting edge of the cutting insert has increased rigidity.

SUMMARY

However, the above-described cutting tool does not have an edge strong enough to machine hard works with a hardness exceeding 50 HRC which have become more available in recent years, and the edge may fracture during machining, which reduces the useful life or efficiency of the cutting insert.

With the foregoing in view, it is an object of the present invention to provide a cutting insert and a cutting tool capable of suppressing edge fracture when hard works are machined.

A cutting insert according to one embodiment of the present invention includes two end surfaces having a plurality of corner parts and opposed to each other, a peripheral side surface extending between the two end surfaces, and a cutting edge formed at an intersecting edge between at least one of the two end surfaces and the peripheral side surface, the cutting edge has at least a first corner edge formed at a first corner part, a second corner edge formed at a second corner part adjacent to the first corner part, and a major cutting edge and an end cutting edge provided between the first and second corner edges and connected to each other, the end cutting edge has a circular-arc shape, which projects outward, as viewed from an end surface side, the end cutting edge has a width which is from 15% to 50% of a width of the cutting insert in a direction connecting an outer end of the first corner edge and an outer end of the second corner edge, and the end cutting edge has an arc radius which is from 1/3 to 1/1 of the width of the cutting insert.

According to the embodiment, the width and the arc radius of the end cutting edge are defined as described above, so that the end cutting edge can have increased strength and the edge is less likely to fracture during cutting.

The end cutting edge may be provided across a center line passing through a center in a width-wise direction of the cutting insert and extending in a direction orthogonal to the widthwise direction as viewed from a side of a peripheral side surface, and a first end of the end cutting edge on a side of the major cutting edge may be in a position higher than a second end of the end cutting edge on the opposite side to the major cutting edge.

The end cutting edge may include a first curve, which projects upward, and a second curve, which projects downward, as viewed from the side of the peripheral side surface, the first curve may be connected to the major cutting edge, and an angle formed between a straight line connecting opposed ends of the end cutting edge and a line orthogonal to the center line of the cutting insert may be greater than 0° and smaller than 20°.

The end cutting edge may have the first curve, the second curve, and a straight line provided between the first and second curves and continuously connected to the first and second curves.

The cutting edge may have a minor cutting edge between the end cutting edge and the second corner edge.

An angle formed between a line connecting the outer end of the first corner edge and an outer most point of the circular-arc shape of the end cutting edge and a line connecting the outer end of the second corner edge and the outer most point of the circular-arc shape of the end cutting edge may be at most 150°.

A cutting tool according to another embodiment of the present invention includes a tool body part and the above-described cutting insert mounted at a leading end of the tool body part, and the cutting insert is mounted around a rotational axis of the tool body part and has an end surface thereof directed in a rotation direction.

As viewed from a leading end side of the tool body part, the cutting insert may be mounted so that a line connecting opposed ends of the end cutting edge of the cutting insert is arranged at an angle from −10° to 6° in the rotation direction with respect to a line connecting a connecting point between the end cutting edge and the major cutting edge of the cutting insert, and the rotational axis of the cutting tool.

The angle may be in the range from −10° to 2°.

DETAILED DESCRIPTION

Figure 1:
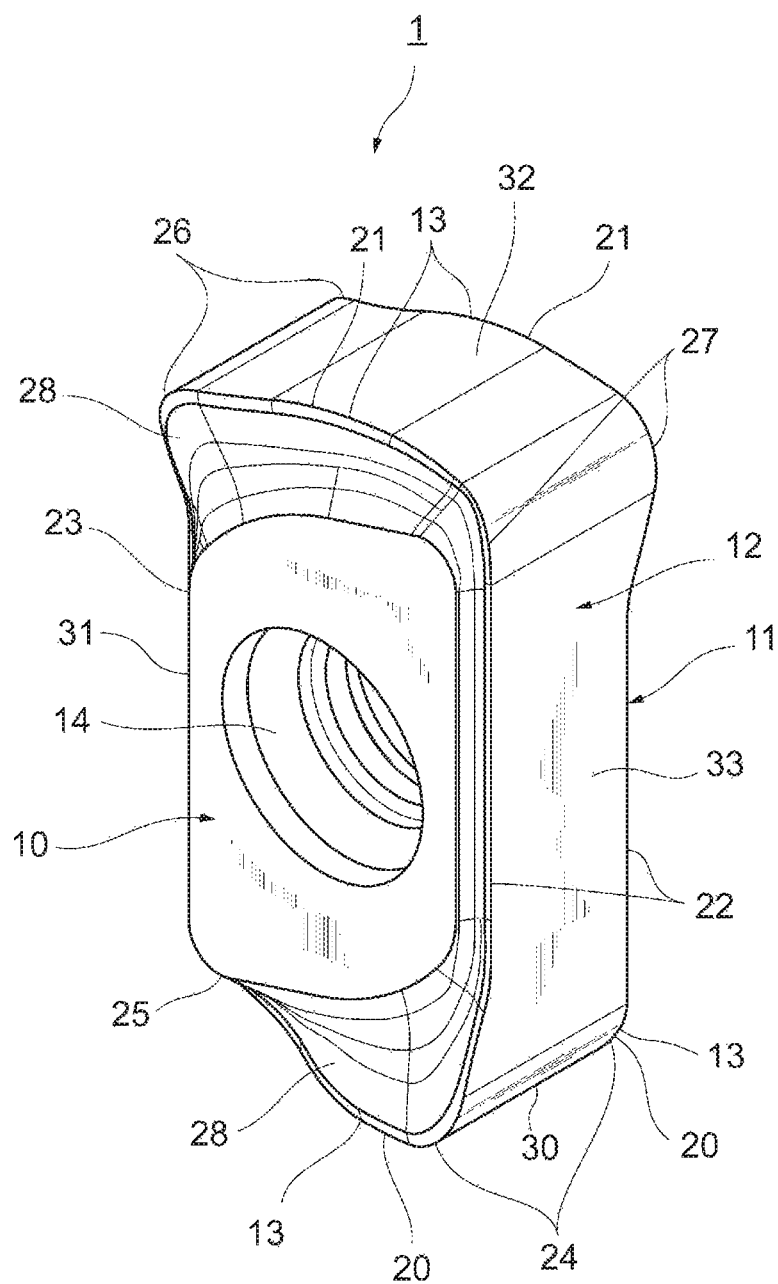
FIG. 1 is a perspective view of a cutting insert.

Now, a preferred embodiment of the present invention will be described with reference to the accompanying drawings. Note that the same elements are designated by the same reference characters, and their description will not be repeated. The positional relation for example about the top, bottom, left, and right is based on the positional relation shown in the drawings unless otherwise specified. The dimensional ratios for drawings are not limited to those shown in the drawings. The following embodiment is an example for describing the present invention and is not intended to limit the present invention.

Figure 2:
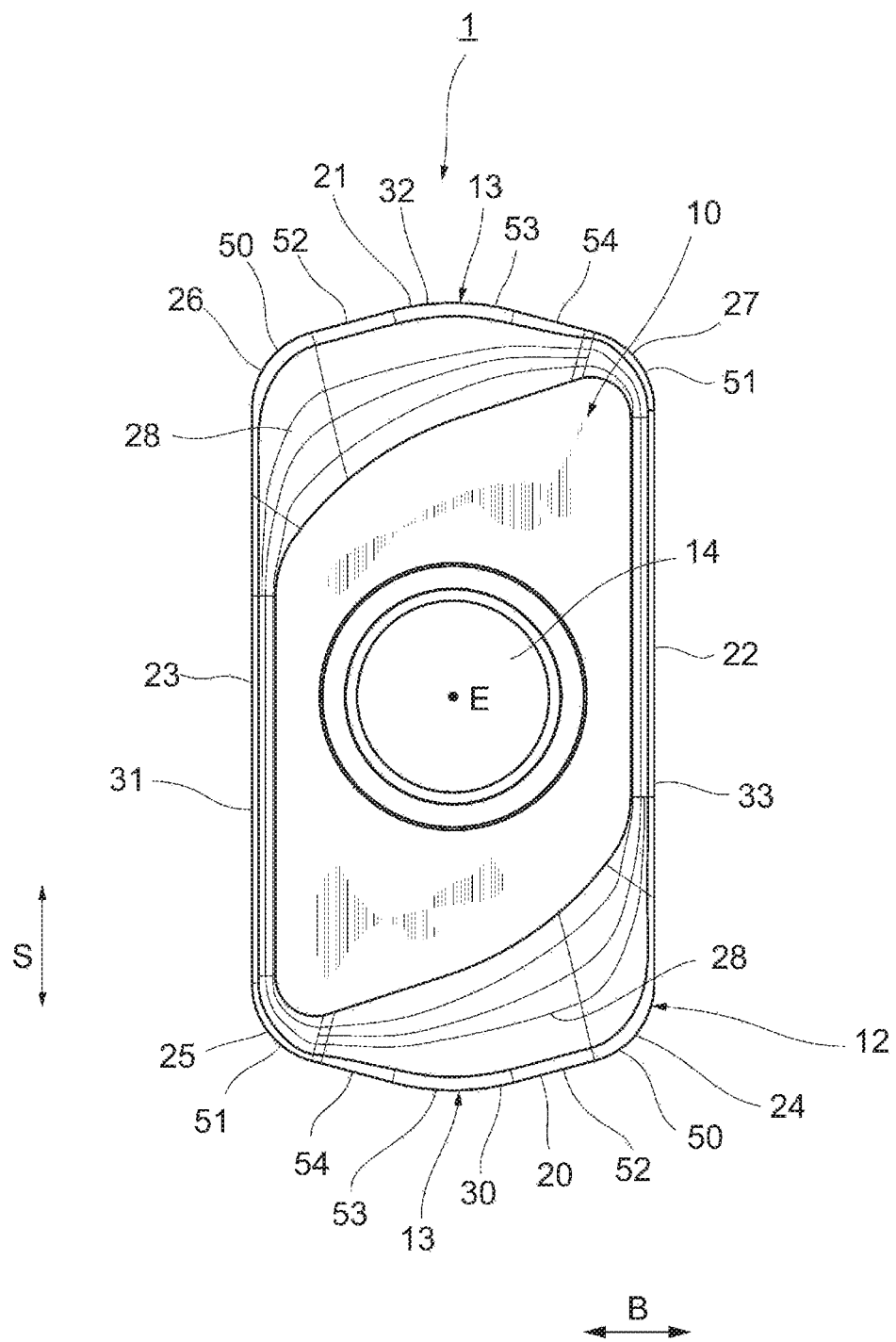
FIG. 2 is a front view of the cutting insert as viewed from the side of an end surface thereof.
Figure 3:
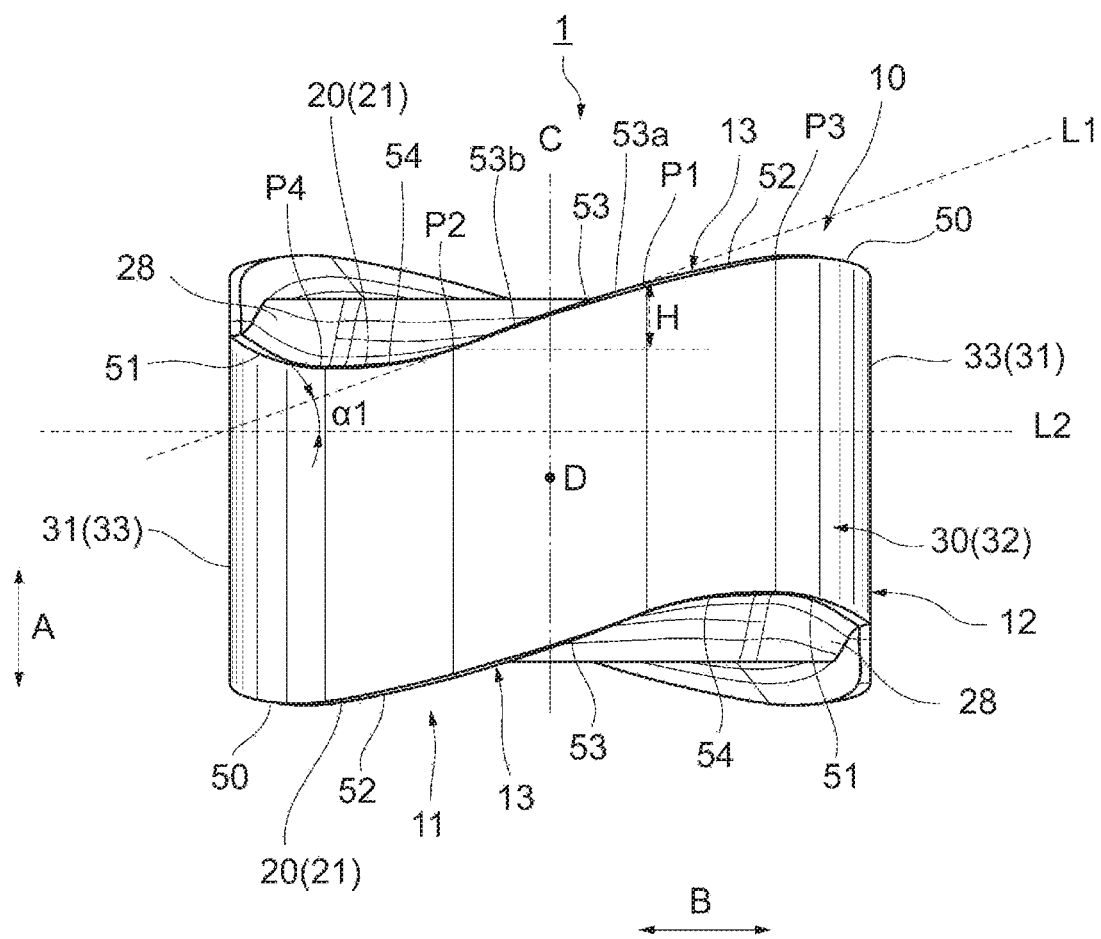
FIG. 3 is a side view of the cutting insert as viewed from the side of a peripheral side surface thereof.

FIG. 1 is a perspective view of a cutting insert 1 according to the embodiment, and FIG. 2 is a front view of the cutting insert 1 as viewed from the side of an end surface thereof. FIG. 3 is a side view of the cutting insert 1 as viewed from the side of a peripheral side surface thereof.

The cutting insert 1 is for an end mill which may suitably be used for high-feed machining. As shown in FIGS. 1 and 2, the cutting insert 1 has a substantially rectangular parallelepiped. The cutting insert 1 includes first and second end surfaces 10 and 11 opposed to each other, a peripheral side surface 12 extending between the first and second end surfaces 10 and 11, and cutting edges 13 formed at a part of intersecting edges between the two end surfaces 10 and 11 and the peripheral side surface 12. A fixing hole 14 that penetrates in an end surface direction A (the top-down direction in FIG. 3) from the first end surface 10 to the second end surface 11 is provided in the center of the cutting insert 1.

As viewed from the side of the end surfaces 10 and 11, the first and second end surfaces 10 and 11 each have a substantially rectangular shape. For example as shown in FIG. 2, the first end surface 10 includes a pair of short sides 20 and 21 opposed to each other, a pair of long sides 22 and 23 opposed to each other, and four corner parts 24, 25, 26, and 27. The first end surface 10 is provided with a chip breaker (groove) 28 along the cutting edge 13 (each of the short sides 20 and 21). The second end surface 11 has the same structure as that of the first end surface 10.

The peripheral side surface 12 has four peripheral side surface parts 30, 31, 32, and 33 corresponding to the sides of the rectangular shapes of the end surfaces 10 and 11. For example, the peripheral side surface parts 30 and 32 correspond to the short sides 20 and 21 and are curved substantially outward as viewed from the side of the end surface 10. The peripheral side surface parts 31 and 33 correspond to the long sides 22 and 23 and are formed linearly and parallel to each other as viewed from the side of the end surface 10.

As shown in FIGS. 1 to 3, the cutting edges 13 are formed at intersecting edges (short sides 20) between the peripheral side surface part 30 and the end surfaces 10 and 11 and at intersecting edges (short sides 21) between the peripheral side surface part 32 and the end surfaces 10 and 11.

As shown in FIG. 2, for example the cutting edge 13 between the peripheral side surface part 30 and the end surface 10 has a first corner edge 50 formed at a first corner part 24, a second corner edge 51 formed at a second corner part 25, and a major cutting edge 52, an end cutting edge 53, and a minor cutting edge 54 that are provided between the first and second corner edges 50 and 51 and connected with one another. More specifically, the cutting edge 13 has the first corner edge 50, the major cutting edge 52, the end cutting edge 53, the minor cutting edge 54, and the second corner edge 51 continuously in this order from the first corner part 24 to the second corner part 25.

Figure 4:
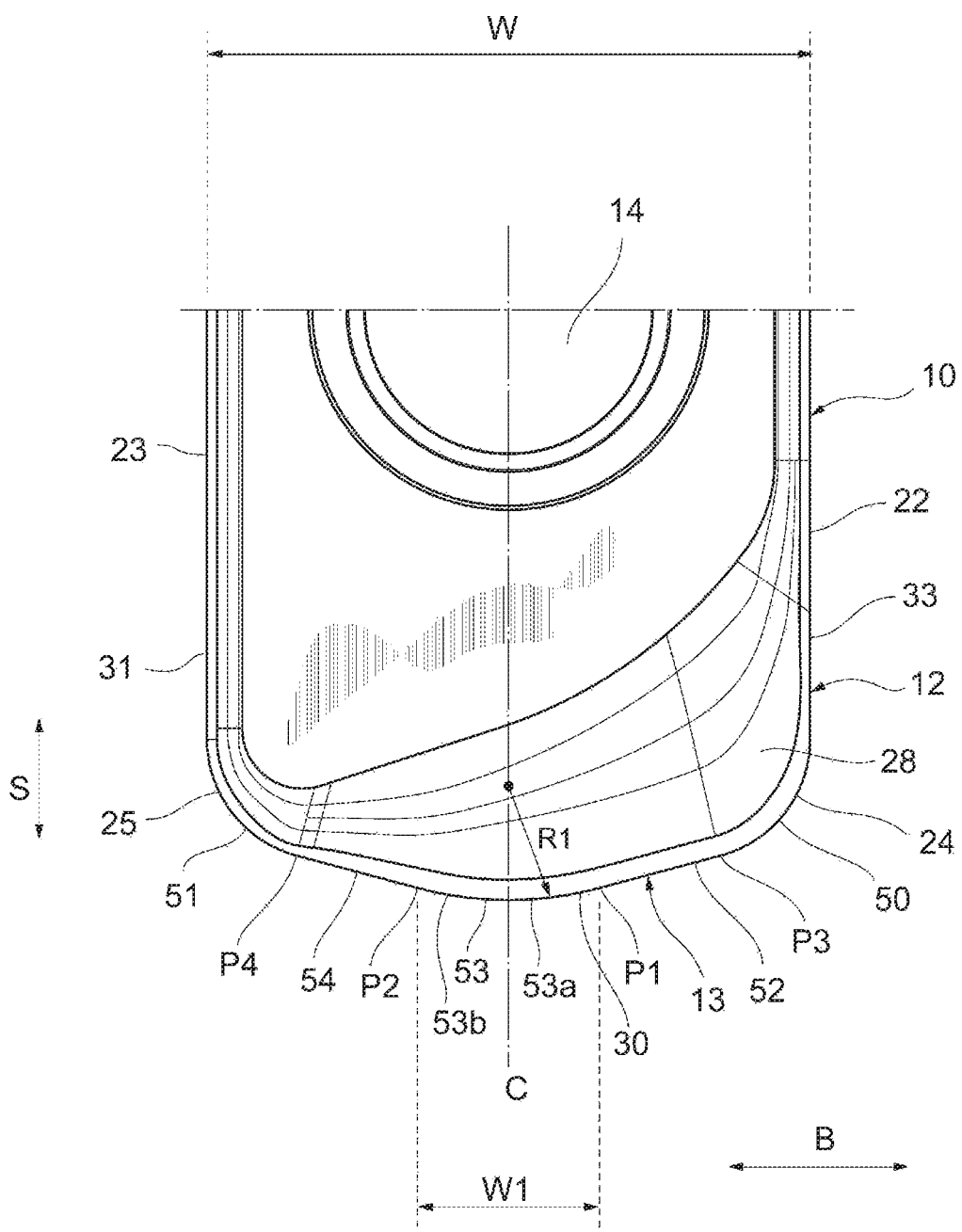
FIG. 4 is an enlarged view of a first end surface of the cutting insert.

As shown in FIG. 4, the end cutting edge 53 is formed to have a circular-arc shape which projects outward as viewed from the side of the end surface 10. The arc radius R1 of the end cutting edge 53 is from ⅓ to 1/1 of the width W of the cutting insert 1. The width w1 of the end cutting edge 53 as viewed from the side of the end surface 10 (the distance from a connecting point P1 between the end cutting edge 53 and the major cutting edge 52 to a connecting point P2 between the end cutting edge 53 and the minor cutting edge 54) is from 15% to 50%, preferably from 17% to 44% of the width W of the cutting insert 1 in a short side direction B (a direction connecting the outer end of the first corner edge 50 and the outer end of the second corner edge 51).

The end cutting edge 53 is provided across a virtual center plane (center line) C in the longitudinal direction S through the center of the short side direction B of the cutting insert 1. The major cutting edge 52 connects the end cutting edge 53 and the first corner edge 50 (at a connecting point P3) and is for example linear as viewed from the side of the end surface 10. The minor cutting edge 54 connects the end cutting edge 53 and the second corner edge 51 (at a connecting point P4) and is for example linear as viewed from the side of the end surface 10. The first and second corner edges 50 and 51 are curved to conform to the shapes of the corner parts 24 and 25, respectively. Note that the major cutting edge 52, the minor cutting edge 54, the first corner edge 50, and the second corner edge 51 each have a width (length) set as appropriate according to the width w1 of the end cutting edge 53.

As shown in FIG. 3, as viewed from the side of the peripheral side surface part 30, the end cutting edge 53 on the side of the end surface 10 is provided across the virtual center plane (center line) C in the end surface direction A through the center of the cutting insert 1 in the short side direction B, and the first end (connecting point P1) on the side of the major cutting edge 52 is in a position higher than the second end (connecting point P2) on the side of the minor cutting edge 54 in the end surface direction A.

The end cutting edge 53 on the side of the end surface 10 includes a first curve 53a which projects upward and a second curve 53b which projects downward and the curves are continuous with each other as viewed from the side of the peripheral side surface part 30. The major cutting edge 52 is curved upward and connected smoothly with the first curve 53a. The minor cutting edge 54 is curved downward and connected smoothly with the second curve 53b.

As viewed from the side of the peripheral side surface part 30, the first corner edge 50 on the side of the end surface 10 is for example curved upward and smoothly connected with the major cutting edge 52. The highest point is in the vicinity of the connecting point P3 between the first corner edge 50 and the major cutting edge 52, and the outer end of the first corner edge 50 is slightly lowered. The second corner edge 51 is for example curved downward and smoothly connected with the minor cutting edge 54. The lowest point is in the vicinity of the connecting point P4 between the second corner edge 51 and the minor cutting edge 54, and the outer end of the second corner edge 51 is slightly raised.

As viewed from the side of the peripheral side surface part 30, an angle α1 formed between a straight line L1 which connects the opposed ends (connecting points P1 and P2) of the end cutting edge 53 and a line (plane) L2 orthogonal to the center line C of the cutting insert 1 is greater than 0° and smaller than 20°.

As shown in FIG. 3, the cutting edge 13 which corresponds to the edge between the peripheral side surface part 30 and the end surface 11 and the cutting edge 13 on the end surface 10 are arranged with 180°-rotational symmetry around a central axis D of the cutting insert 1 as viewed from the side of the peripheral side surface part 30 and have the same structure as that of the cutting edge 13 on the side of the end surface 10 above. More specifically, the cutting edge 13 between the peripheral side surface part 30 and the end surface 11 includes the first corner edge 50, the major cutting edge 52, the end cutting edge 53, the minor cutting edge 54, and the second corner edge 51 continuously in this order from the second corner part 25 to the first corner part 24.

The cutting edge 13 which corresponds to the edge between the peripheral side surface part 32 and the end surface 10 and the cutting edge 13 which corresponds to the edge between the peripheral side surface part 32 and the end surface 11 are arranged with 180°-rotational symmetry around a central axis E (in FIG. 2) of the cutting insert 1 as the cutting edge 13 on the side of the peripheral side surface part 30 is viewed from the side of the end surface 10, and have the same structure as the cutting edge 13 on the side of the peripheral side surface part 30 as shown in FIG. 3.

Figure 5:
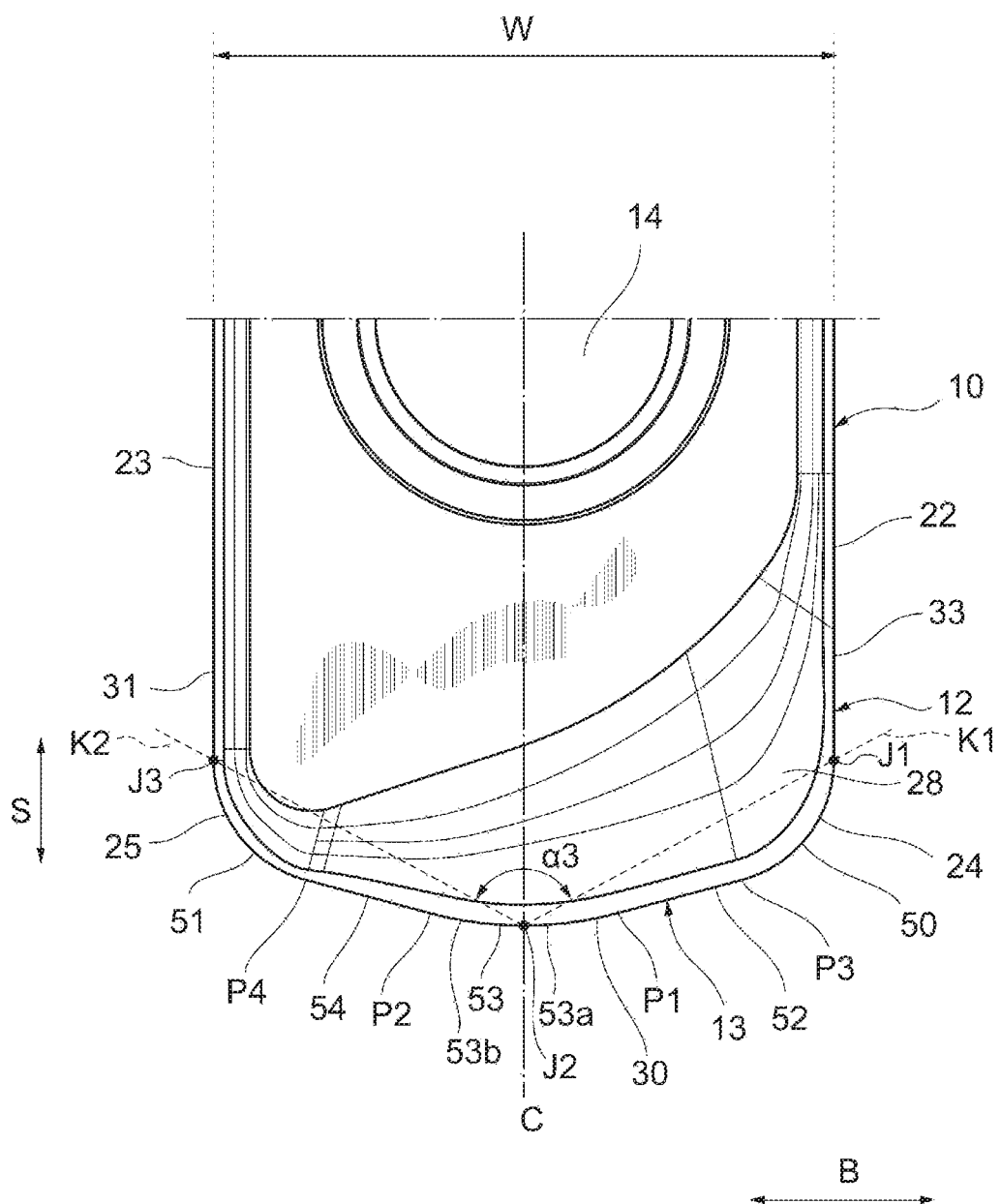
FIG. 5 is an enlarged view of the first end surface of the cutting insert indicating an angle α3.

The cutting insert 1 according to the embodiment is suitably used for high feed machining performed at high feeding speed. For example, as shown in FIG. 5, when the cutting insert 1 is viewed from the side of the end surface 10, an angle α3 formed between a line K1 connecting an outer end J1 of the first corner edge 50 and a point J2 corresponding to the outermost projecting part of the circular-arc shape of the end cutting edge 53 and a line K2 connecting an outer end J3 of the second corner edge 51 and the point J2 corresponding to the outermost projecting part of the circular-arc shape of the end cutting edge 53 is not more than 150°, preferably from 120° to 140°.

As for the size of the cutting insert 1, the width W of the cutting insert 1 in the short side direction B is for example about 6 mm, the length of the cutting insert 1 in the longitudinal direction S is about 12 mm. The cutting insert 1 has a thickness (the distance between the end surfaces 10 and 11) of about 3.5 mm.

The material of the cutting insert 1 may be selected from, but not limited to, any of hard materials such as cemented carbide, cermet, ceramics, and a sintered body containing cubic boron nitride or any of the hard materials having a surface coated with a PVD or CVD coating film, or monocrystalline diamond or a sintered body containing diamond.

Figure 6:
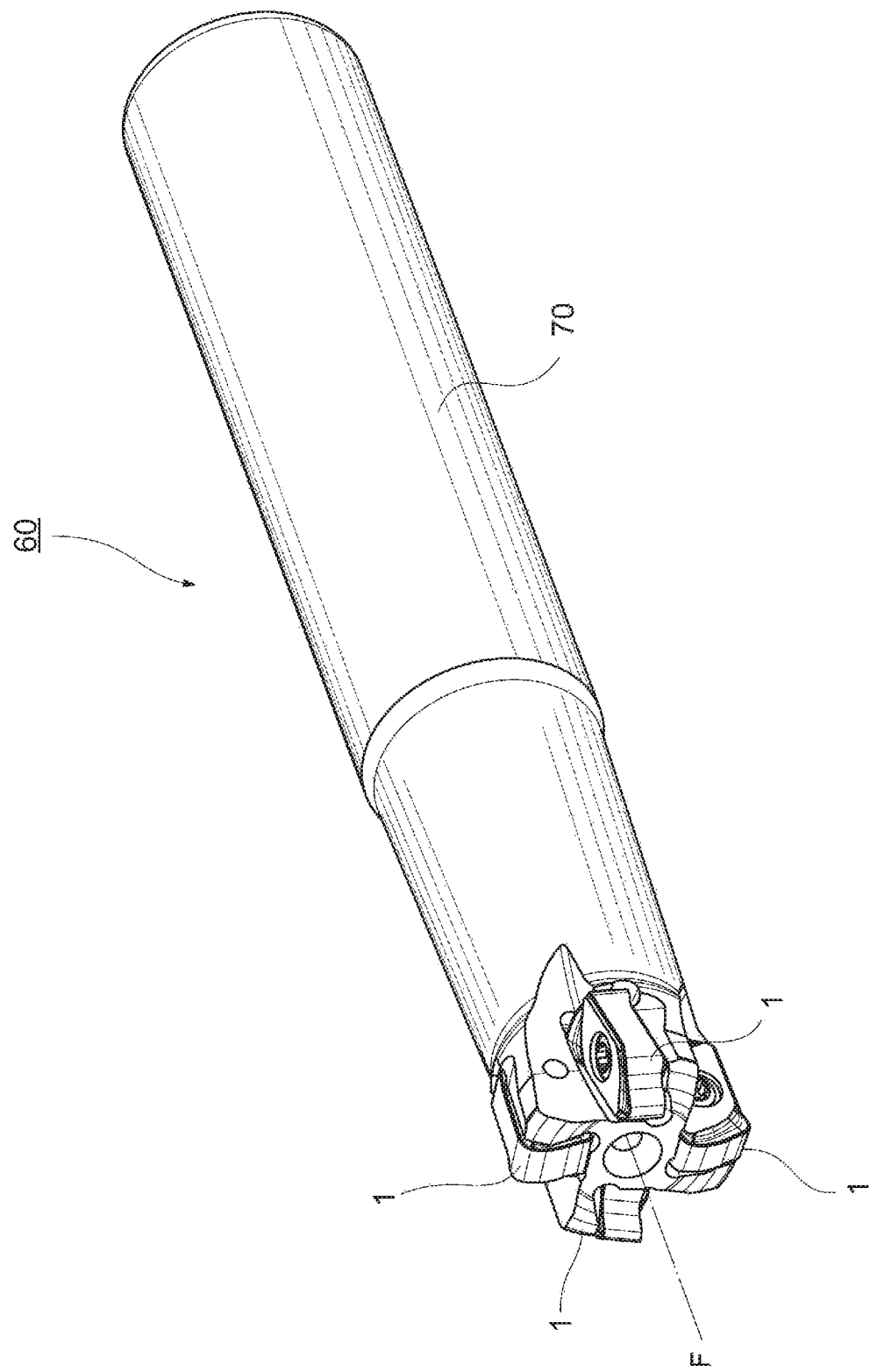
FIG. 6 is a perspective view of a cutting tool.
Figure 7:
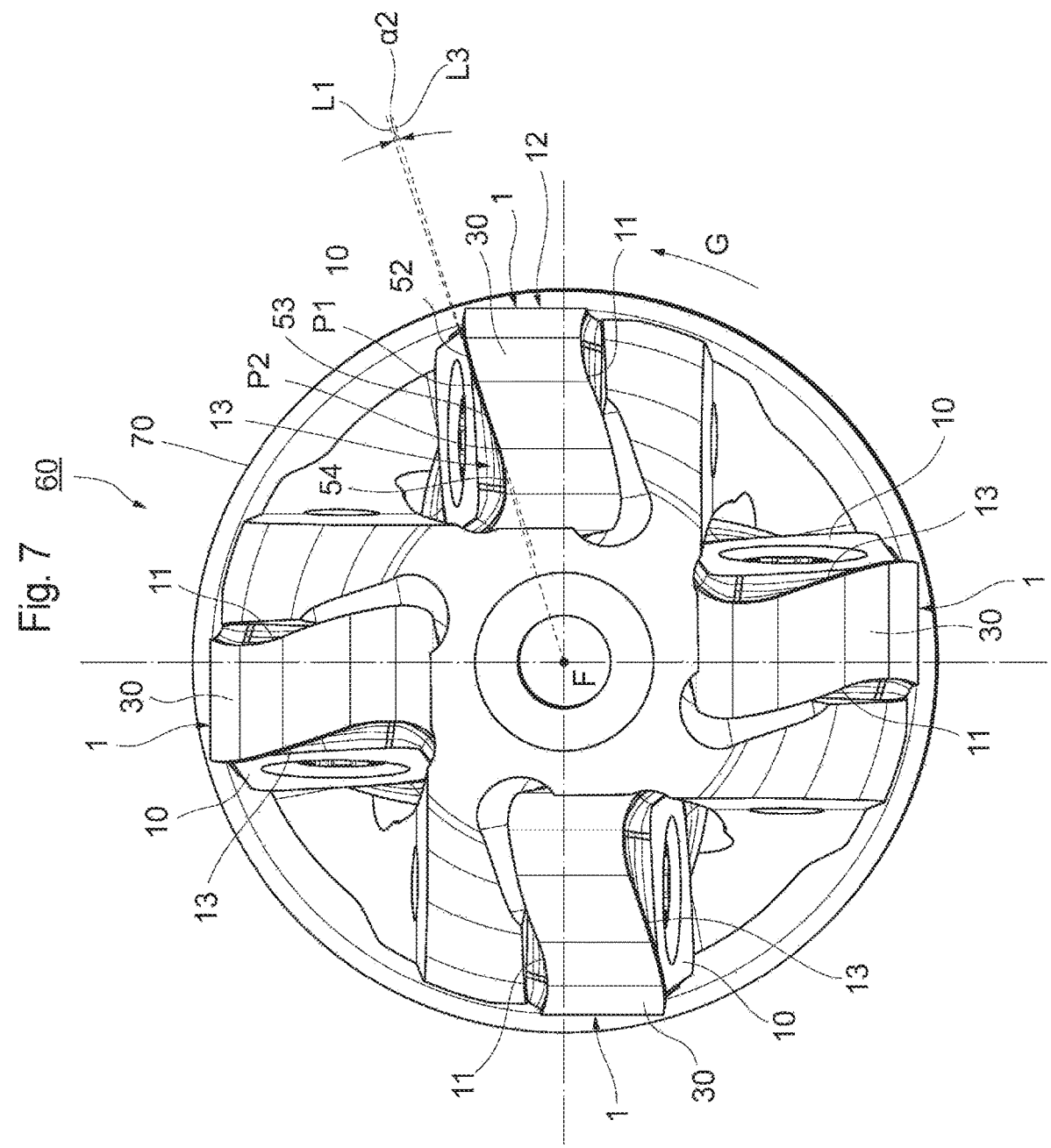
FIG. 7 is a view of the cutting tool as viewed from the side of a leading end thereof.

Now, a cutting tool 60 to which the cutting insert 1 is mounted will be described. The cutting tool 60 as shown in FIG. 6 is an indexable end mill. The cutting tool 60 includes a tool body part 70 and cutting inserts 1. The tool body part 70 is formed to have a columnar shape and has its central axis serving as a rotational axis F. A plurality of cutting inserts 1, e.g., four cutting inserts are mounted at equal intervals around the rotational axis F at the leading end of the tool body part 70. Note that the number of the cutting inserts 1 mounted to the tool body part 70 is not limited to four. As shown in FIG. 7, the cutting inserts 1 are mounted so that the first end surfaces 10 or the second end surfaces 11 are directed in a rotation direction G and the peripheral side surface parts 30 or 32 are arranged to face the leading end side of the cutting tool 60.

In this manner, as viewed from the side of the leading end of the tool body part 70, the cutting inserts 1 are mounted so that the line L1 connecting the opposed ends P1 and P2 of the end cutting edge 53 of the cutting insert 1 is at an angle α2 from −10° to +6°, preferably from −10° to +2° in the rotation direction G with respect to a line L3 connecting the connecting point P1 between the end cutting edge 53 and the major cutting edge 52 of the cutting insert 1 and the rotational axis F of the cutting tool 60 (where a positive value corresponds to the rotation direction G and a negative value corresponds to the direction inverse to the rotation direction G).

According to the embodiment, the cutting edge 13 has the circular-arc shaped end cutting edge 53 which projects outward as viewed from the side of the end surface 10 or 11, the end cutting edge 53 has a width w1 which is from 15% to 50% of the width W of the cutting insert 1, and the arc radius R1 of the end cutting edge 53 is from ⅓ to 1/1 of the width W of the cutting insert 1. In this way, the width w1 of the end cutting edge 53 is sufficiently large and the arc is gentle, so that the end cutting edge 53 can have increased strength, and fracture in the cutting edge 13 during cutting can be suppressed.

As viewed from the side of the peripheral side surface 12, the end cutting edge 53 is arranged across the center line C of the cutting insert 1, and the first end (connecting point P1) of the end cutting edge 53 on the side of the major cutting edge 52 is in a position higher than the second end (connecting point P2) of the end cutting edge 53 on the opposite side to the major cutting edge 52. As a result, the cutting edge 13 contacts a work in the order from the side of the end cutting edge 53 toward the major cutting edge 52 during cutting, so that fracture in the cutting edge 13 during cutting can be more appropriately suppressed.

As viewed from the side of the peripheral side surface 12, the end cutting edge 53 includes a first curve 53a which projects outward and a second curve 53b which projects inward, the curves are provided continuously with each other, and the first curve 53a is connected to the major cutting edge 52, while as viewed from the side of the peripheral side surface 12, the angle α1 formed between the straight line L1 connecting the opposed ends (connecting points P1 and P2) of the end cutting edge 53 and the plane L2 orthogonal to the center line C of the cutting insert 1 is greater than 0° and smaller than 20°. As a result, the end cutting edge 53 is relatively gently raised toward the major cutting edge 52, so that abrupt application of a load upon the end cutting edge 53 during cutting can be avoided, and fracture in the cutting edge 13 can be more appropriately suppressed.

The cutting edge 13 has the minor cutting edge 54 between the end cutting edge 53 and the second corner edge 51, and therefore the process of excavation with the cutting tool 60 in the rotation direction can appropriately be carried out.

In the cutting tool 60, the cutting insert 1 is mounted so that, as viewed from the side of the leading end of the tool body part 70, the angle α2 formed between the line L1 connecting the opposed ends (connecting points P1 and P2) of the end cutting edge 53 of the cutting insert 1 and the line L3 connecting the connecting point P2 between the end cutting edge 53 and the major cutting edge 52 of the cutting insert 1 and the rotational axis F of the cutting tool 60 is from −10° to +6° in the rotation direction G. As a result, the strength of the cutting edge 13 and the chip discharging capability can be well balanced.

Although the preferred embodiment of the present invention has been described with reference to the accompanying drawings, the same is not intended to limit the present invention. It is understood that variations and modifications would be apparent to those skilled in the art within the scope of the concept recited in the claims, and the variations and modifications naturally fall within the technical scope of the present invention.

Figure 8:
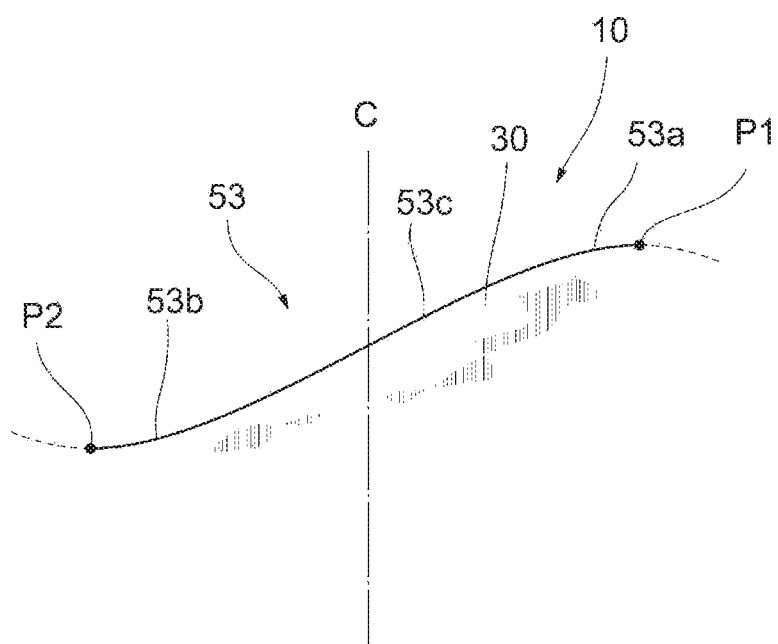
FIG. 8 is a schematic view of an end cutting edge having another shape.

The structure of the end cutting edge 53 for example is not limited to that according to the embodiment. As shown in FIG. 8, the end cutting edge 53 may include the first curve 53a which projects upward, the second curve 53b which projects downward, and a straight line 53c provided between the first and second curves 53a and 53b and connected continuously to the first and second curves 53a and 53b as viewed from the side of the peripheral side surface part 30.

Figure 9:
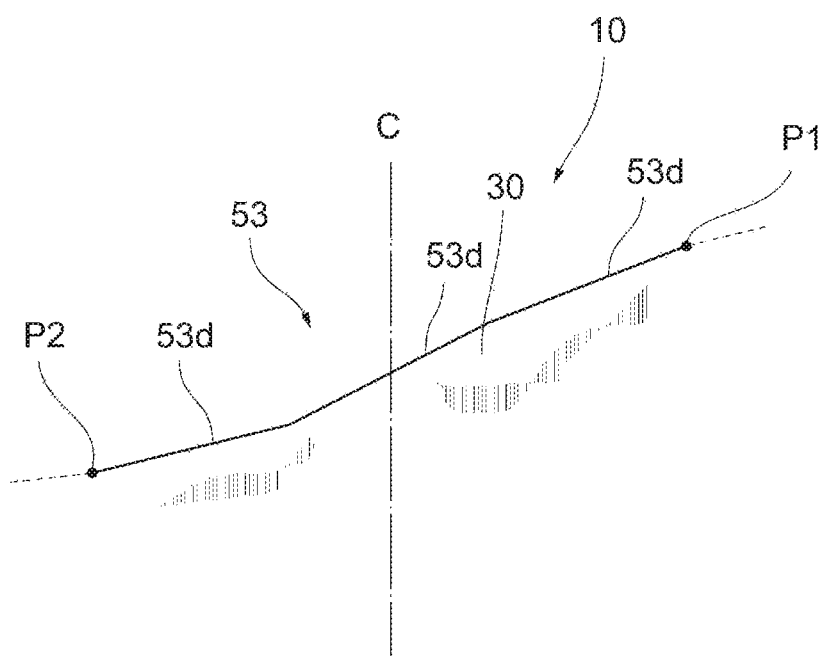
FIG. 9 is a schematic view of the end cutting edge having another shape.

For example as shown in FIG. 9, the end cutting edge 53 may include a plurality of straight lines 53d connected with one another as viewed from the side of the peripheral side surface part 30 and may be inclined downward from the major cutting edge 52 to the minor cutting edge 54.

According to the embodiment described above, the cutting edge 13 does not have to include the minor cutting edge 54. More specifically, the cutting edge 13 may include the first corner edge 50, the major cutting edge 52, the end cutting edge 53, and the second corner edge 51 continuously connected in this order. The structure of the other part of the cutting insert 1 is not limited by the embodiment. For example, the cutting insert 1 may have a diamond shape instead of the substantially rectangular shape. The cutting insert 1 may have any of a triangular shape, a pentagonal shape, a hexagonal shape, and an octagonal shape. The position or number of cutting edges 13 is not limited to those according to the embodiment. The cutting edges 13 are provided at the opposed end surfaces 10 and 11 of the cutting insert 1, while the cutting edges may be provided at only one of the end surfaces. The cutting edges 13 are provided at the two short sides of each of the end surfaces 10 and 11, while the cutting edges may be provided at one or three sides as a part of the end surface or at all the four sides of the end surface.

The cutting tool 60 according to the embodiment is an indexable end mill, but the present invention may be applied to other kinds of cutting tools such as a milling cutter and a drill.

EXAMPLES

An experiment was conducted in which the time until fracture of a cutting edge was measured using each of cutting inserts having structures listed in Table 1. The experiment was conducted under the conditions in which the cutting speed Vc was 120 m/min, the advancing amount of one edge per rotation fz (so-called "feed per edge") was 0.32 mm, the cutting edge width ae was 50.5 mm, the tool diameter was 80 mm, the kind of work was SKD61 (having a hardness of 52 HRC), and the number of cutting inserts mounted with a tool was one. The experiment result is given in Table 1.

TABLE 1

| | Ratio of end cutting edge width to cutting insert edge width (%) | Arc radius of end cutting edge | Machining time until fracture (min) |
|---|---|---|---|
| Inventive example 1 | 17 | 1/3 | 42 |
| Inventive example 2 | 30 | 3.5/6 | 43 |
| Inventive example 3 | 40 | 11/12 | 40 |
| Comparative example 1 | 14 | 1/3 | 30 |
| Comparative example 2 | 67 | 8/6.35 | 25 |
| Comparative example 3 | 87 | 15/14 | 30 |

The present invention is useful in providing a cutting insert capable of suppressing cutting edge fracture when a work having high hardness is machined.

What is claimed is:

1. A cutting insert, comprising:
    two end surfaces having a plurality of corner parts and opposed to each other;
    a peripheral side surface extending between the two end surfaces; and
    a cutting edge formed at an intersecting edge between at least one of the two end surfaces and the peripheral side surface,
    the cutting edge having at least a first corner edge formed at a first corner part, a second corner edge formed at a second corner part adjacent to the first corner part, and a major cutting edge and an end cutting edge provided between the first and second corner edges and connected to each other,
    the end cutting edge having a circular-arc shape, which projects outward, as viewed from an end surface side, the end cutting edge having a width which is from 15% to 50% of a width of the cutting insert in a direction connecting an outer end of the first corner edge and an outer end of the second corner edge, the end cutting edge having an arc radius which is from ⅓ to 1/1 of the width of the cutting insert,
    the end cutting edge is provided across a center line passing through a center in a width-wise direction of the cutting insert and extending in a direction orthogonal to the widthwise direction as viewed from a side of a peripheral side surface, and a first end of the end cutting edge on a side of the major cutting edge is in a position higher than a second end of the end cutting edge on the opposite side to the major cutting edge,
    the end cutting edge includes a first curve, which projects upward, and a second curve, which projects downward, as viewed from the side of the peripheral side surface, the first curve is connected to the major cutting edge, and an angle formed between a straight line connecting opposed ends of the end cutting edge and a line orthogonal to the center line of the cutting insert is greater than 0° and smaller than 20°, and
    the end cutting edge has the first curve, the second curve, and a straight line provided between the first and second curves and continuously connected to the first and second curves.

2. The cutting insert according to claim 1, wherein the cutting edge has a minor cutting edge between the end cutting edge and the second corner edge.

3. The cutting insert according to claim 1, wherein an angle formed between a line connecting the outer end of the first corner edge and an outer most point of the circular-arc shape of the end cutting edge and a line connecting the outer end of the second corner edge and the outer most point of the circular-arc shape of the end cutting edge is at most 150°.

4. A cutting tool, comprising:
    a tool body part; and
    a cutting insert, comprising:
        two end surfaces having a plurality of corner parts and opposed to each other;
        a peripheral side surface extending between the two end surfaces; and
        a cutting edge formed at an intersecting edge between at least one of the two end surfaces and the peripheral side surface,
    the cutting edge having at least a first corner edge formed at a first corner part, a second corner edge formed at a second corner part adjacent to the first corner part, and a major cutting edge and an end cutting edge provided between the first and second corner edges and connected to each other,
    the end cutting edge having a circular-arc shape, which projects outward, as viewed from an end surface side, the end cutting edge having a width which is from 15% to 50% of a width of the cutting insert in a direction connecting an outer end of the first corner edge and an outer end of the second corner edge, the end cutting edge having an arc radius which is from ⅓ to 1/1 of the width of the cutting insert,
    the cutting insert is mounted at a leading end of the tool body part, the cutting insert is mounted around a rotational axis of the tool body part and has an end surface thereof directed in a rotation direction, and as viewed from a leading end side of the tool body part, the cutting insert is mounted so that a line connecting opposed ends of the end cutting edge of the cutting insert is arranged at an angle from −10° to 6° in the rotation direction with respect to a line connecting a connecting point between the end cutting edge and the major cutting edge of the cutting insert, and the rotational direction of the cutting tool.

5. The cutting tool according to claim 4, wherein the range of the angle is from −10° to 2°.

* * * * *